Patented Jan. 7, 1941

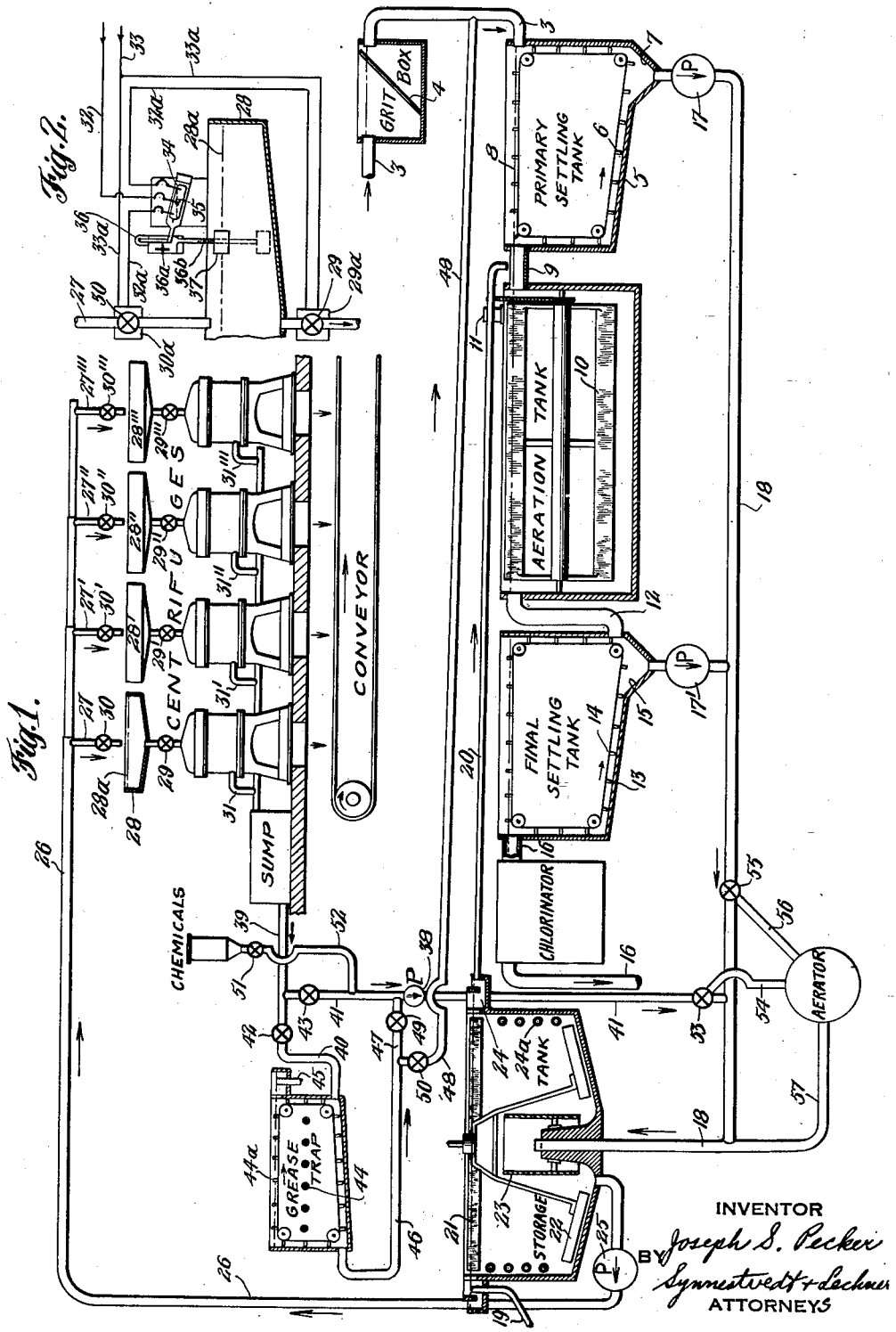

2,228,017

UNITED STATES PATENT OFFICE 2,228,017

SEWAGE DISPOSAL

Joseph S. Pecker, Philadelphia, Pa., assignor to American Centrifugal Corporation, New York, N. Y., a corporation of Delaware Application February 3, 1936, Serial No. 62,061

7 Claims. (Cl. 210—2)

This invention relates to sewage disposal, and particularly to means and methods for treating and handling the sewage, in general between the point of admission of the collected raw sewage to the disposal plant and the final discharge of the treated material therefrom, and more especially (as to certain aspects) the treatment and handilng of the sewage in the latter stages of the plant. The various purposes and advantages of the invention will be best understood by means of a brief statement of the problems and disadvantages to be overcome.

Ordinarily, in sewage disposal plants now commonly in use, the raw or green sewage is passed through one or more gravity settling tanks, after which, or between two of which, there is introduced an activation treatment (as by aeration) or a chemical treatment (such as the introduction of lime, chlorine, alum, or a small quantity of ferric chloride, or certain combinations thereof), the effluent from the final settling tank being ultimately discharged to any available stream or other body of water, usually after a thorough chlorination.

In such systems, there may for example be a primary settling tank in which the average detention period would be around 1½ to 2 hours, in which tank a considerable proportion of the sedible solids is deposited in the form of sludge, about 96% of which is moisture, such sludge being ordinarily taken off from the bottom of the tank. Typically, the partially clarified fluid adjacent the top of this tank flows into an aeration tank in which various available means of aeration, and in some instances also agitation, may be employed, the average time of detention being about 6 to 10 hours. Alternatively, as above indicated, a chemical treatment tank may be employed at this point, to coagulate and/or precipitate lighter solids and solids in a dissolved or a colloidal state. From the aeration or biological process tank (or alternatively from the chemical treatment tank) the effluent flows by gravity into a final settling tank in which the average period of detention is about an hour and a half, from whence the substantially clarified liquid flows, in some instances through a chlorination tank, into any available stream. The sludge taken from the bottom of the final settling tank may average about 99% moisture.

In the activated, i. e., aerated, system, which, with sundry variations, is perhaps the most commonly employed today, the final effluent is of sufficiently low content of oxygen-demanding organic material as to be safely passed into rivers or streams. However, the treatment and disposal of the sludge from the various tanks has heretofore presented a serious problem. The commonly accepted procedure, according to the biological process, is to deliver the activated sludge into one or more digestion tanks, which are provided with heating coils to hasten the digestion process, which may take from 3 to 9 months, and in which the temperature must be subject to fairly close control. From these tanks the supernatant liquid is returned to the head of the system, and the digested sludge, containing about 94% moisture, is conveyed to drying beds, to remain there for a period of about 2 to 8 weeks, while liquid evaporates and/or drains down through sand filters. The dried cake on the beds (still containing about 70% moisture) must then be removed—a laborious procedure, often requiring expensive equipment—and the beds must be re-sanded.

In addition to the costly equipment, the constant care and attendance, and the great length of time required by such known processes, there are the added problems of having to collect and make some use of the gases taken off from the digestion tanks and to guard against explosions thereof, and the problem of minimizing, if possible, the risks attendant upon unpleasant and obnoxious odors, fumes and vapors from the drying beds, especially if the digestion is not completed. Thus, sewage disposal systems now in general use are in various respects economically and hygienically unsatisfactory.

One of the primary purposes of the present invention is to overcome the problems and disadvantages of such known systems, and in general to substantially reduce the time and cost and increase the cleanliness and safety of sewage disposal, and more particularly by the substitution of mechanical, or chiefly mechanical, means and methods for the biological methods, in treating and disposing of the sludge, while at the same time producing a drier final product (in a substantially shredded cake form) which can be safely and satisfactorily used either as a fertilizer (with proper chemical treatment) or as a fuel (incineration being practical as the final product is sufficiently dry to support its own combustion).

More specifically, the invention involves a method and apparatus employing centrifugal drying of sludges and clarification of the liquids therein, and especially by a novel relationship and cooperation of one or more centrifuges with one or more of the known sludge settling and associated units, in a manner to eliminate the more expensive of the plant units and the more lengthy and expensive plant processes. In addition, the invention contemplates the utilization or operation of certain of the known primary or preliminary units in a novel manner such as to improve the operation of the mechanical portion of the equipment, notably the centrifugal separators, and the handling and treatment of the effluent from the latter in a manner to improve the operation of said preliminary units.

Further, the invention contemplates the provision of improved mechanism for feeding and controlling the delivery of the sludges to the centrifuges, in a manner to increase the efficiency and improve the operation of the latter, and also certain novel and improved apparatus in the treatment and handling of the effluent from the centrifuges.

Still more specifically, the invention contemplates a sewage disposal system and method of operation which involve (in conjunction with the known practice of delivering the raw sewage through a grit or straining chamber to a primary settling tank, the effluent of which passes to a treatment tank, such as an aerator, and from thence to a final settling tank from where the effluent flows, desirably through a chlorinator, to a point of final disposal) various novel features, among which may be mentioned: the delivery of the sludges taken from the settling tanks into one or more centrifuges, preferably through a combining tank or similar unit which also serves as a storage or equalization reservoir, the delivery to the centrifuges being by means of one or more gravity feed tanks designed and operated to measure the cyclical feed and render uniform the rate and amount of the feed to the centrifuges; the utilization of such storage tank as a sludge thickener, and preferably also as a grease trap and chemical treatment unit; the conjoint control of the feed of sludge to the gravity tanks and thence to one of more centrifuges, preferably automatic, both as to volume and rate of feed, in co-ordinated relation to the cycle of operation of the centrifuges; the return to the system of effluent from the centrifugals and/or from the thickener and the separation of greases, at will, from said effluent, before returning same to the system; the controlled variation of the point at which effluent from the centrifugals is returned to the system and the control or regulation of the rate and time of feed of the effluent returned to the system from the cyclically-operated centrifuges in a manner to co-ordinate the same with the more uniformly operated settling tanks; the control of condition, physical, chemical and bacteriological, and particularly of the concentration, of sludges delivered to the mechanical parts of the system (notably the centrifuges); the utilization of the centrifuge effluent return and/or the degreasing means and/or chemical treatment apparatus and/or aerating equipment to so control the condition of the sludges delivered to the centrifuges; and various other features of novelty and advantage which will hereinafter appear or which will be evident to those skilled in the art or which may be incident to the invention.

The present preferred embodiment and operation of the invention will now be described with reference to the accompanying drawing, in which:

Figure 1 is a schematic diagram of a sewage disposal system embodying a preferred form of, and operable in accordance with, the present invention; and Figure 2 is a diagrammatic view illustrating details of the automatic control of certain parts of the mechanism of Figure 1, some of the elements of which are not shown in Figure 1 because of the small scale thereof.

Referring first to Figure 1, it will be seen that the raw or green sewage enters the system through any suitable conduit or pipe 3 which delivers to the primary settling tank through the intermediation of any suitable strainer chamber or grit box in which there may be a screen 4. During the course of the average detention period of 1½ to 2 hours in said primary tank (which time is determined by the capacity of the tank and rate of flow of the incoming sewage) the heavier sedible solids gravitate to the bottom floor 5, from where they are scraped by means of a slow-moving conveyor 6 of known type into the collector pocket or sump 7, in which they accumulate in the form of a sludge which is ordinarily about 95% moisture when drawn off from the tank.

The supernatant partially clarified liquid, the level of which is indicated at 8, flows off through the trough or other suitable connection 9 into a chemical settling tank or alternatively (as here shown) an aeration tank which may be of a capacity to provide an average detention period of from 6 to 10 hours. The aeration tank may incorporate any suitable aerating means such as the rotating paddle device or agitator 10, driven by a motor 11, for thoroughly stirring up and aerating the mixture, which is largely water, containing, however, an appreciable percentage of finely divided solids and solids in a dissolved or colloidal state. The aeration effects a biological activation and a coagulation or agglomeration of solids.

The effluent from the aeration tank flows through the connection 12 into the final settling tank, wherein by gravity action the coagulated fine solids and the like settle to the floor 13 for collection by the scraper 14 into the pocket 15 in the form of a sludge ordinarily averaging about 98% to 99% moisture.

The substantially clarified water passes through an outlet pipe 16, preferably through a chlorinator (which may be of known type) to any point of final disposal, the final effluent passing out pipe 16 being substantially clear water and of sufficiently low content of dangerous bacteria as to be safely discharged into streams or other bodies of water.

The foregoing apparatus or system is similar to the preliminary or primary stages of known systems, but the handling, treatment and disposal of the sludges from this point on, and the special cooperation of the elements just described, with the novel parts of the system hereinafter to be described, represent substantial departures from usual practice.

According to the present invention, the sludges are fed, either by gravity, or more desirably (as here shown) by one or more pumps 17, 17', depending upon the number of gravity settling tanks, through a pipe 18 into a storage tank, the combined sludge delivered thereto averaging about 97% moisture. As here shown, this tank, which has the additional functions of mixing, chemically treating, thickening and degreasing the sludges, is located at a slight elevation above the level of the liquid in the settling and associated tanks, and this in combination with a positive pumping delivery to the storage tank is of advantage in preventing irregularity of feed to the storage tank and also in providing for gravity flow-off of the greases through the drain pipe 19 and gravity return of further-clarified effluent through the pipe 20 into the primary stages of the system.

The pump line 18 delivers into the storage tank below the grease skimmer 21, which is a sow-turning rotor or wheel having skimming blades. A rotary sludge scraper 22 may also be provided, and may conveniently be driven in synchronism with the skimmer, by any suitable motor (not shown). A circular baffle 23 causes portions of the liquid in the storage tank to take a circuitous course to the outlet or grease trap 24, thus aiding in the further settling of solids and collection of greases (thus concentrating the sludge), as well as in the inter-mixture of chemicals, which may be introduced in a manner hereinafter referred to. The cooling coil 24a also facilitates the separation of the greases.

The finally conditioned and combined sludges, now averaging about 94% moisture, are delivered, preferably by a pump 25, through a pipe 26, to one or more outlet pipes 27, 27', etc., the number of which is determined by the number of gravity feed tanks 28, 28', etc., now to be described.

While a single gravity feed tank may be employed, even where a battery of centrifuges is to be used, there are certain special advantages in utilizing a separate tank for each centrifugal separator, which will be explained after a description of one of the tanks 28 and its associated mechanism. The tank 28 is relatively shallow in proportion to its plan area and is preferably located a substantial distance above the centrifugal machine or centrifuge to which it delivers through a connection having a valve 29 (or 29', etc.). The branch pipe 27 delivering to the tank 28 is also equipped with a valve, indicated at 30 (or 30', etc.).

With the valve 29 closed, the valve 30 is opened until the tank 28 is filled to the top or to a predetermined level indicated at 28a. The delivery valve 30 is then closed and the feed valve 29 is opened, with the subjacent centrifuge in operation. The volume of the charge is measured by the tank 28, and the rate of feed is determined primarily by the gravity head which is maintained approximately constant because of the shallow depth of the tank. Thus a predetermined uniform volume of sludge is delivered at a predetermined substantially constant rate through a predetermined time interval; and the timing of the delivery can be made to coincide with the purging portion of the cycle of operation of the centrifuge. During this centrifuging stage, the liquid effluent from the centrifugal machine flows off through a pipe 31. The cleaning stage of operation of the centrifuge then normally follows, during which the dried sludge cake is shredded off and discharged from the bottom of the machine, as indicated by the arrow, onto a conveyor or to any other point of use or disposal; and during the cake-discharging stage of operation of the centrifuge, the re-charging of the tank 28 is taking place, with the valve 29 closed and the valve 30 open.

It may here be mentioned that while the centrifuges have been shown more or less diagrammatically, various forms of such machines being capable of use in this system, reference may be had to my copending application Serial No. 712,390, filed December 21, 1934, now Patent No. 2,056,885, issued October 6, 1936, for a detailed illustration of a machine especially well adapted to this type of work. Such a machine may be, for example, of a size and capacity capable of handling, each day, the thickened sludge derived by the present system from five million gallons of sewage per day, dewatering the sludge to a point where the final sludge cake contains only about 60% moisture, which is dry enough for the final product to be burned without the addition of other fuel.

However, with various centrifugal machines, particularly the specific example referred to, the greatest efficiency of operation, the most economical utilization of the equipment, and the maintenance of substantial uniformity in the end product, can only be obtained if a substantial uniformity of feed is secured, during the centrifuging operation, such as this invention makes possible by means of the controlled and gravity fed delivery, or the equivalent. Uniformity of condition, particularly concentration, of the sludge is also of substantial importance, especially in conjunction with the fixed volume charging equipment, but this will be described in more detail hereinafter.

Where the daily volume of sewage is such that a battery of several machines is required, the arrangement of separate feeding tanks and valve controls is particularly advantageous, since the centrifuging or purging operation of each machine may follow in sequence with relation to the same stage of operation of the others, and likewise the charging of the tanks may be effected in sequence, during the sequential sludge cake discharge operations of the several machines. To facilitate the desired measuring and feeding operations, I prefer to provide a suitable automatic mechanism in association with the tanks 28 and the manual valves 29 and 30, an example of such mechanism being illustrated in Figure 2, but omitted from Figure 1 for the sake of clarity. In the latter figure it will be clearly seen that the valve 29 has a valve motor 29a and the valve 30 a valve motor 30a, which by weights, springs, floats or other mechanism, or electrically, may be biased to valve closing position (the details of such mechanism being not necessary to this case as valve operating motors are well known), and they may be alternatively opened by means of an electric current delivered by a power line 32, 33. The connections 33a, 33a, are constantly coupled to the two valve motor devices, while the connections 32a, 32a are alternatively activated, i. e., the electrical circuits to the two motor devices are alternatively energized, by means for example of the mercury switch 34 which is fulcrumed at 35 so as to be brought into either of the two positions indicated, by means of the link device 36 slidably coupled thereto and mounted upon a float 37.

The quantity of sludge to be automatically measured by the tank 28 can be adjusted to suit conditions, such as the sludge concentration, the size of the centrifuge and its rate of operation, etc., by adjusting the length of the link slot by means of the wing-nut device 36a and adjusting the position of the float upon the threaded end 36b of the link member.

When the gravity tank 28 is filled to the predetermined level 28a, as shown in Figures 1 and 2, the float 37 has actuated the switch to the position indicated in full lines, thus energizing motor 29a to open the valve 29; a substantially simultaneous disconnection of the circuit to the valve motor 30a permitting the valve 30 to go to closed position. The reverse operation of this automatic mechanism will be evident without further description. The co-ordination of the measurement and the feeding of the sludge relative to the capacity and speed of operation of the centrifuge, in accordance with the present invention, overcomes to a large extent the inefficiency and other difficulties heretofore encountered because of variations in sludge volume delivered due to variations in pipe flow area, friction, time, etc.

The control of the cyclical operation of the centrifuges may also be automatically carried out, for example according to the method and by means of the mechanism disclosed and claimed in my copending application No. 759,302, filed December 26, 1934; now Patent No. 2,080,874, issued May 18, 1937.

Returning now to Figure 1, and the remainder of the system which is therein shown, it will be seen that the centrifuges deliver their effluent into a gravity fed sump, from whence the remainder of the operations may also be conducted by gravity if the succeeding portions of the equivalent are located at sufficient height above the preliminary tanks of the plant. However, for greater flexibility and control I may take the effluent from the sump by means of a pump 38 which is utilized to return the effluent into the system. Whichever means of return is used, it is desirable that the sump (diagrammatically shown) be of substantial capacity, since the preliminary stages of the system, such as settling and aeration tanks normally operate continuously, whereas the individual centrifugal machines, particularly of the type hereinbefore referred to, operate in cycles and the whole battery of them may perhaps be operating only a third or a half of each 24-hour period, and it is desirable that the feed of the centrifuge effluent back into the system may be coordinated with the more or less steady flow of the incoming sewage or alternatively with the more or less continuous feed of the sludges into the storage tank.

As briefly indicated hereinabove, it may be quite important for most effective use of the equipment as well as for uniformity of the final sludge cake and also of proper operation of the effluent-handling parts of the system, that the condition of the sludges be subject to control and stabilization. A certain measure of conditioning may also be necessary or desirable with reference to the incoming raw sewage, depending upon the nature thereof, weather conditions, the amount of surface drainage going into the city sewage system, etc.

In addition to the foregoing, I have found it desirable to control or regulate the character of the sludges and centrifuge effluent delivered into the storage or thickener tank, primarily to aid in the further precipitation of solids and also to kill odors and render the final product more or less stable for use as a fertilizer. The effluent from the centrifugal machines, having a pH of approximately 6, contains solids in colloidal suspension which are too light to settle out by gravity, under such an acid condition, and if passed into the thickener tank, with the sludges, might result in the material therein stratifying, with a layer of heavier solids at the bottom, a layer of relatively clarified supernatant liquid above that, and a blanket of fine colloids mixed with grease on the surface.

The present invention contemplates accomplishing the necessary control by one or the other or a combination of the following two methods.

The pH characteristic of the material, which is a symbol used in the industry to designate acidity or alkalinity, should approximate the figure 7; for example, water, which is substantially neutral or stable, has a pH around that figure. When the pH goes appreciably below 7 there is an acid condition and when it goes appreciably above 7 there is an alkaline condition. The alkaline condition is desirable to assist precipitation and accomplish the other results just mentioned, and this condition may be obtained by the introduction for example of lime or chlorine.

In conjunction with or alternative to such chemical treatment, I have found that if a small amount of aerated sludge is mixed with the centrifuge effluent, and especially if the same be then further aerated, prior to introduction, into the thickener or storage tank, the solids in the aerated sludge will act as a "seed," facilitating the rapid development of aerobic bacteria which act to purify the mixture by converting complex and harmful nitrogenous compounds into simpler and less harmful compounds; and this seed in combination with the added air will cause the colloids in the effluent to settle to the bottom in the storage tank along with the other solids leaving a relatively clear mother liquor above the mass.

With the above ends in view, I have provided the following mechanism for the treatment and handling of the more or less turbid liquid or effluent discharged from the centrifuges.

The pipe 39 delivers to a couple of branches 40 and 41, controlled respectively by valves 42 and 43. Pipe 40 delivers to the grease trap shown, in which there may be a cooling coil 44 and a traveling belt grease skimmer 44a to aid in the separation of greases (which constitute about 35% of the total remaining solids); there being a grease drain at 45; and the degreased liquid discharged from the trap flows through the pipe 46 to two branches 47 and 48, controlled respectively by valves 49 and 50.

The pump 38 in the pipe 41 is connected to deliver to the storage tank by way of the valve 53 and the sludge conduit 18. The pipe 48 delivers into one of the preliminary tanks of the plant, preferably the primary settling tank, for example by way of the raw sewage inlet pipe 3. The pipe 47 may be used to pass effluent from the pipe 41 into the pipe 48 and thus back to the preliminary stages of the system, or alternatively to pass degreased effluent from the pipe 46 into the storage tank by way of the pipes 41 and 18. Thus, depending upon the setting of the valves 42, 43, 49 and 50, the effluent from the centrifuges may be passed to either one of a plurality of points in the preliminary stages of the plant, at will; or may be passed first through a degreaser and then to either one of such plurality of points, at will; or a portion of it may be carried through one of said courses and a portion through another. By this alternative hookup, the condition of the sewage and sludges may be controlled, regulated or varied, not only in a way to control and/or render uniform the condition of the sludge delivered to the centrifuges but also to regulate to some extent the operation and effectiveness of the settling and aeration tanks.

Cooperating with the foregoing portions of the system is a tank for chemicals, of the character hereinbefore mentioned, which delivers through a valve 51 and pipe 52 to the storage and treatment tank, as by way of the pipes 41 and 18. The chemical tank may be located at a sufficient height to secure gravity feed, as herein shown, or may employ a positive pressure feeding means. By the piping and valve arrangements shown, the chemicals may be either intermittently or continuously delivered, and may be fed either to an early stage of the system (via valve 51, pipe 52, valve 49, pipe 47, valve 50 and pipe 48) or to a later stage (via valve 51 and pipes 52, 41 and 18). In this way, the condition of the sewage and/or sludges may be further regulated, and it should be especially noted that when the introduction of the chemicals is made to the storage tank the concentration of the combined sludge delivered to the centrifuges may be controlled to a considerable extent, by chemical precipitation, and further the sludges may be so chemically treated that the final sludge cake discharged by the centrifuges may be rendered stable as against putrefactive activity, so that the dried sludge cake may safely be utilized as fertilizer, if desired. It might again be emphasized that by suitably varying the type of chemicals, the time and rate of feed, and the point of delivery into the system, they may be successfully employed to minimize odors and to lower the biochemical oxygen demand of the sewage and/or sludges.

A mixing of aerated sludge with the centrifuge effluent takes place when said effluent is passed from pipe 41 into pipe 18. However, further aeration and activation can be obtained as follows:

Valve 53 is of the 2-way type so as to deliver either into pipe 18 or into pipe 54, or in an intermediate position divide the flow between the two. A valve 55, of similar type, is placed in pipe 18 so that all or a variable proportion of the sludge in pipe 18 may be passed into pipe 56. Pipes 54 and 56 deliver into a mixing aerator of any suitable commercially available type, from whence the pipe 57 delivers back into pipe 18 and thence to the storage tank. An improvement in settling and purification in the storage tank may thus be obtained by this mechanism, as with the chemical feeding mechanism.

Considering the system as a whole, one of the major advantages may best be illustrated by an example: assuming that the incoming sewage, delivered to the plant by the pipe 3, contains solids in the proportion of 200 parts per million, figuring the solids on a dry basis, it will be apparent that 1,000,000 gallons of sewage would contains 200 gallons volume of dry material, which will approximate 1666 pounds. If this dry material is concentrated in a sludge of, for example 97% moisture, the volume of sludge will amount to approximately 6666 gallons, and we may consider for the sake of example that this is the volume delivered per day through the pipe 18 by the pumps 17, 17'. Stating it another way, there would be approximately 100 pounds of solids in each 400 gallons of a sludge of 97% moisture, and therefore, in order to handle the 1666 pounds of solids contained in a million gallons of sewage, in one day's time, the centrifugal machinery would have to handle 6666 gallons of sludge per day, at this particular concentration.

If the sludge be further concentrated, for example by 3% (measured in terms of solids content); that is, if the sludge be reduced to a moisture content of 94% (instead of 97%), the gallonage of sludge to be dewatered will be cut in half, that is, reduced from approximately 6666 gallons to approximately 3333 gallons. This further concentration of the sludge is effected, in the present system, by the storage tank and associated mechanism.

A centrifuge having a capacity of 400 gallons of sludge per cycle, and capable of dewatering the sludge to a cake of 60% moisture in an operating cycle of 10 minutes (just by way of example) can thus handle, with some margin to spare, the 3333 gallons in 9 cycles of operation, i. e. in a 1½ hour period of time, instead of requiring a 3 hour period as would be the case if the sludge were taken from the pumps 17, 17' directly to the centrifuge. By operating the centrifuge on an 8 hour day, one such machine could thus handle, in the present system, five million gallons of sewage per day.

From the foregoing, which of course are only approximate figures and are only given by way of example and not by way of limitation, it will now be quite evident that an important advantage is gained in decreasing the percentage of moisture content in the sludge, a decrease from 97% to 94% resulting in practically cutting in half the total volume of sludge to be centrifugally dewatered. It will also be seen that there is substantial advantage in maintaining uniformity of sludge concentration, as is done by the present system, so that the measurement of a uniform quantity for each cycle of operation of the centrifuge, and the uniform rate of delivery thereof to the centrifuge, will result in utilization of the centrifugal apparatus at maximum efficiency and produce a final cake of uniform dryness.

From the foregoing it will now be clear to those skilled in the art how the various objects and advantages of the invention are obtained. By way of brief summary it might be stated that the apparatus and method, as disclosed, are capable of effecting savings approximating the following figures: 25% in operating expenses, 40% in capital cost, 50% in land area utilized, and a reduction in time from about a 6 to 9 month process down to a 24 hour process.

The terms "sewage" and "sewage sludge," as employed herein, are intended to be inclusive of other materials presenting similar or equivalent problems as to handling, treatment and/or disposal.

I claim:

1. The method of sewage disposal which comprises: continuously settling the solids out of the incoming raw sewage in a plurality of stages to form a plurality of sludge of different moisture content; combining said sludge to effect an averaging of the moisture content; substantially concentrating the combined sludges to a predetermined thickness; and thereafter centrifuging the concentrated sludge.

2. In a sewage disposal system, sludge settling and concentrating apparatus divided into a plurality of stages, centrifugal separating mechanism to which sludges from said apparatus are fed, means for returning effluent from the separating mechanism to at least one of the stages of said apparatus, and means for degreasing the effluent prior to recirculation.

3. In a sewage handling system, means for separating solids from the raw sewage to form sludges and for collecting said sludges, mechanism for centrifuging the sludges, apparatus for aerating the sludges intermediate their collection and their final centrifuging, and means for returning centrifuged liquid and mixing the same with the collected aerated sludges.

4. In the handling and treatment of sewage or the like, the method which includes separating solids as a sludge from the raw sewage and activating at least a portion of said sludge, centrifuging the sludge, and returning the centrifuge effluent and mixing the same with the activated sludge beyond the zone of initial separation.

5. In the handling and treatment of sewage or the like, the method which includes separating solids as a sludge from the raw sewage and activating at least a portion of said sludge, centrifuging the sludge, returning the centrifuge effluent and mixing the same with the activated sludge, aerating the mixture, storing the aerated mixture for precipitation and thickening of the sludge, and centrifuging the thickened sludge.

6. The method of sewage disposal which comprises: continuously settling the solids out of the incoming raw sewage, in the form of sludge of relatively high moisture content; subsequently concentrating the sludge by another stage of settling to reduce its volume; utilizing the latter stage of settling to store a substantial quantity of concentrated sludge and to thicken the same to a substantially uniform relatively low moisture content; and intermittently centrifuging lesser quantities of the stored uniformly concentrated sludge.

7. In the treatment of sewage, the method which includes precipitating solids out of the same to form sludge, aerating the precipitated sludge, separating greases therefrom, and then centrifuging the remaining sludge.

JOSEPH S. PECKER.

CERTIFICATE OF CORRECTION.

Patent No. 2,228,017.　　　　　　　　　　　　　　January 7, 1941.

JOSEPH S. PECKER.

It is hereby certified that error appears in the printed specification of the above numbered patent requiring correction as follows: Page 2, first column, line 41, for "of" before "more" read --or--; and second column, line 41, for "99%" read --99½%--; page 3, first column, line 4, for "sow-" read --slow- --; page 4, first column, line 17, for the word "equivalent" read --equipment--; line 47, for "sewage" read --sewer--; page 5, first column, line 47, for "contains" read --contain--; and second column, lines 46 and 47, claim 1, for "sludge" read --sludges--; and that the said Letters Patent should be read with this correction therein that the same may conform to the record of the case in the Patent Office.

Signed and sealed this 11th day of February, A. D. 1941.

(Seal)

Henry Van Arsdale,
Acting Commissioner of Patents.